United States Patent
Kinjo

(10) Patent No.: US 7,839,517 B1
(45) Date of Patent: Nov. 23, 2010

(54) IMAGE PROCESSING SYSTEM, AND IMAGE PROCESSING APPARATUS AND PORTABLE INFORMATION COMMUNICATION DEVICE FOR USE IN THE IMAGE PROCESSING SYSTEM

(75) Inventor: Naoto Kinjo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 2489 days.

(21) Appl. No.: 10/401,702

(22) Filed: Mar. 31, 2003

(30) Foreign Application Priority Data

Mar. 29, 2002 (JP) ............................. 2002-132112

(51) Int. Cl.
*G06F 3/12* (2006.01)
(52) U.S. Cl. ..................... 358/1.15; 709/218; 709/219
(58) Field of Classification Search ................ 358/1.15; 709/218, 219; 382/118
See application file for complete search history.

(56) References Cited

U.S. PATENT DOCUMENTS

| | | | |
|---|---|---|---|
| 6,701,845 B2 | 3/2004 | Ohmura | |
| 6,775,023 B1 * | 8/2004 | Fukunaga et al. | 358/1.15 |
| 6,956,666 B2 | 10/2005 | Tanaka | |
| 7,038,801 B2 * | 5/2006 | Kurozasa et al. | 358/1.15 |
| 7,096,280 B2 * | 8/2006 | Aoki et al. | 709/246 |
| 7,106,887 B2 * | 9/2006 | Kinjo | 382/118 |
| 2001/0019420 A1 | 9/2001 | Sanbongi et al. | |
| 2002/0015514 A1 | 2/2002 | Kinjo | |
| 2002/0054345 A1 * | 5/2002 | Tomida et al. | 358/1.15 |

FOREIGN PATENT DOCUMENTS

| | | |
|---|---|---|
| EP | 1 133 104 A2 | 9/2001 |
| JP | 2001-128113 A | 5/2001 |
| JP | 2001-256024 A | 9/2001 |
| JP | 2001-265553 A | 9/2001 |
| JP | 2002-077592 A | 3/2002 |
| WO | WO 99/17529 | 4/1999 |
| WO | WO 00/31966 | 6/2000 |

* cited by examiner

*Primary Examiner*—Twyler L Haskins
*Assistant Examiner*—Michael Burleson
(74) *Attorney, Agent, or Firm*—Sughrue Mion, PLLC

(57) ABSTRACT

The image processing system includes a portable information communication device that displays images based on received image information, sets a displayed image, for which specification input is made based on a timing at which the displayed image is displayed, as a specified image, creates processing indicator information that indicates contents of processing to be performed on the specified image set through the specification input, and transmits image information and the processing indicator information of the specified image and an image processing apparatus that is connected to the portable information communication device through a communication line, receives the image information and the processing indicator information of the specified image and performs image processing on the received image information of the specified image based on the received processing indicator information.

15 Claims, 3 Drawing Sheets

IMAGE PROCESSING SYSTEM, AND IMAGE PROCESSING APPARATUS AND PORTABLE INFORMATION COMMUNICATION DEVICE FOR USE IN THE IMAGE PROCESSING SYSTEM

BACKGROUND OF THE INVENTION

1. Field of the Invention

The present invention relates to an image processing system, and an image processing apparatus and a portable information communication device for use in the image processing system. In particular, the present invention relates to an image processing system in which image processing is performed on an image obtained by a portable information communication device such as a mobile telephone, and an image processing apparatus and a portable information communication device for use in the image processing system.

2. Description of the Related Art

In recent years, portable information communication devices including mobile telephones and PDA (Personal Digital Assistant) terminals have come rapidly into widespread use.

With a mobile telephone, for instance, it is possible to transmit and receive image information as well as voice information through a communication line. Therefore, it is possible to receive an image from an image delivery site providing an image delivery service or to receive an image transmitted from a party on the other end and display the received image on a display.

On the other hand, with a personal computer, in order to enhance the quality of an obtained image, image processing is performed on the image using image processing software. Also, there is currently provided a service in which an image is transmitted to a print shop (processing laboratory, for instance) through a communication line and creation of a high-quality print is ordered. At this time, a plurality of images (thumbnail images) are displayed on a display and image processing and selection of an image, whose print is to be ordered, are performed using the displayed images.

However, the portable information communication device like a mobile telephone suffers from the following shortcomings due to its portability. For instance, its display for displaying an image or the like is small, its operability and throughput are inferior, and its memory is small in capacity.

Therefore, the portable information communication device like a mobile telephone has the following various problems. First, the portable information communication device is not suited to simultaneously displaying a plurality of images in order to allow a user to select a desired image. Also, the portable information communication device is not suited to selecting the desired image from among a plurality of displayed images. Further, the portable information communication device is not suited to performing image processing on the desired image. Still further, the portable information communication device is not suited to storing many images for realizing the selection of the desired image.

SUMMARY OF THE INVENTION

The present invention has been made in the light of the problems described above, and is aimed at providing an image processing system, and an image processing apparatus and a portable information communication device for use in the image processing system, with which it becomes possible to obtain a clear and high-quality image by performing image processing on a desired image among images received by the portable information communication device (mobile telephone, for instance), which uses a small display, is inferior in operability and throughout, and is small in memory capacity, with a method suited to the portable information communication apparatus.

In order to solve the problems described above, the inventors of the present invention have repeatedly conducted earnest studies on an image processing method and a print order method adapted to a portable information communication device, such as a mobile telephone, that are different from the image processing and print order method used by a personal computer. The inventors have found as a result of the earnest studies that it is possible to perform image processing on a desired image with a method suited to the portable information communication device and to obtain a clear and high-quality image. Based on the findings, the inventors have made the present invention.

That is, the present invention provides an image processing system comprising:

a portable information communication device that displays images based on received image information, sets a displayed image, for which specification input is made based on a timing at which the displayed image is displayed, as a specified image, creates processing indicator information that indicates contents of processing to be performed on the specified image set through the specification input, and transmits image information and the processing indicator information of the specified image; and an image processing apparatus that is connected to the portable information communication device through a communication line, receives the image information and the processing indicator information of the specified image transmitted from the portable information communication device, and performs image processing on the received image information of the specified image based on the received processing indicator information.

Preferably, the processing indicator information contains output indicator information with reference to which a processed image obtained by performing the image processing is outputted to an output destination, and the image processing apparatus outputs the processed image of the specified image based on the output indicator information.

Preferably, the portable information communication device includes a first communication unit for performing transmission and reception of information; an image displaying unit for performing image displaying based on the image information received by the first communication unit; an image specifying unit for setting the displayed image, for which the specification input is made based on the timing at which the displayed image is displayed by the image displaying unit, as the specified image; and a processing indicator information creating unit for creating the processing indicator information that indicates the contents of the processing to be performed on the specified image set through the specification input, wherein the image information of the specified image set by the image specifying unit through said specification input and the processing indicator information created by the processing indicator information creating unit are transmitted from the first communication unit.

Preferably, the image processing apparatus includes a second communication unit for performing transmission and reception of information; and an image processing unit for performing the image processing on the image information received by the second communication unit, wherein the image information and the processing indicator information of the specified image transmitted from the portable information communication device are received, and the image processing unit performs the image processing on the image information of the specified image based on the processing indicator information.

In addition, the present invention provides a portable information communication device for use in the above-mentioned image processing system, comprising:

a communication unit for performing transmission and reception of information;

an image displaying unit for performing image displaying based on image information received by the communication unit;

an image specifying unit for setting a displayed image, for which specification input is made based on a timing at which the displayed image is displayed by the image displaying unit, as the specified image; and a processing indicator information creating unit for creating processing indicator information that indicates contents of processing to be performed on the specified image set through the specification input, wherein the image information of the specified image set by the image specifying unit through said specification input and the processing indicator information created by the processing indicator information creating unit are transmitted from the communication unit, and wherein the image processing apparatus receives the image information of the specified image and the processing indicator information of the specified image transmitted from the portable information communication device and performs image processing on the received image information of the specified image based on the received processing indicator information.

In addition, the present invention provides an image processing apparatus for use in the above-mentioned image processing system, wherein the portable information communication device displays images based on received image information, sets a displayed image, for which specification input is made based on a timing at which the displayed image is displayed, as a specified image, creates processing indicator information that indicates contents of processing to be performed on the specified image set through the specification input, and transmits image information and the processing indicator information of the specified image, the image processing apparatus comprising:

a communication unit for performing transmission and reception of information; and an image processing unit for performing the image processing on the image information received by the communication unit, wherein the image information and the processing indicator information of the specified image transmitted from the portable information communication device are received, and the image processing unit performs the image processing on the image information of the specified image based on the processing indicator information.

Furthermore, in order to solve the problems described above, the present invention provides an image processing system comprising:

a portable information communication device;

a relay server; and an image processing apparatus, wherein the portable information communication device performs image displaying based on received image information, sets specified image identification information that identifies, as a specified image, a displayed image for which specification input is made based on a timing at which the displayed image is displayed, creates processing indicator information that indicates contents of processing to be performed on the specified image set through the specification input, and transmits the specified image identification information and the processing indicator information to the relay server;

the relay server relays information to be transmitted to the portable information communication device, accumulates and stores image information relayed in advance, receives the specified image identification information and the processing indicator information transmitted from the portable information communication device, extracts the image information of the specified image from the image information accumulated and stored in advance based on the received specified image identification information, and transmits the extracted image information and the processing indicator information of the specified image to the image processing apparatus; and the image processing apparatus is connected to the relay server through a communication line, receives the image information and the processing indicator information of the specified image transmitted from the relay server, and performs image processing on the image information of the specified image based on the processing indicator information.

Preferably, the specified image identification information transmitted from the portable information communication device to the relay server contains device identification information identifying the portable information communication device, incoming date and time information showing when reception information containing the image information of the specified image was received, and address information that is created through the specification input made based on the timing, at which the displayed image is displayed and identifies the image information of the specified image contained in the reception information, a storage unit of the relay server accumulates and stores relay date and time information showing when the information containing the image information to be transferred to the portable information communication device was relayed and transfer destination device identification information identifying the portable information communication device as a transfer destination along with the relayed image information, and the relay server extracts the information containing the image information of the specified image by checking the incoming date and time information and the device identification information contained in the specified image identification information against the relay date and time information and the transfer destination device identification information, and further extracts the image information of the specified image with reference to the address information.

Preferably, the processing indicator information contains output indicator information with reference to which a processed image obtained by performing the image processing is outputted to an output destination, and the image processing apparatus outputs the processed image of the specified image based on the output indicator information.

And, preferably, image quality of a transmission image to be transmitted from the relay server to the portable information communication device is changed from image quality of a recorded image based on the image information accumulated and recorded in the relay server or the processed image to be outputted to the output destination.

Preferably, the portable information communication device includes a first communication unit for performing transmission and reception of information relayed by the relay server; an image displaying unit for performing the image displaying based on the image information received by the first communication unit; an image identification information specifying unit for setting the specified image identification information that identifies the displayed image, for which the specification input is made based on the timing at which the displayed image is displayed by the image displaying unit, as the specified image; and a processing indicator information creating unit for creating the processing indicator information that indicates the contents of the processing to be performed on the specified image identified through the specification input, wherein the specified image identification information set by the image identification information specifying unit through the specification input and the processing indicator information created by the processing indicator information creating unit are transmitted from the first communication unit to the relay server.

Preferably, the relay server includes a third communication unit for relaying and transferring, to the portable information communication device, information transmitted by specifying the portable information communication device as a transmission destination, and further transmitting predetermined information to the image processing apparatus; and a storage unit in which image information relayed by the third communication unit is accumulated and stored, wherein the image information of the specified image is extracted from the storage unit based on the specified image identification information transmitted from the portable information communication device, and the extracted image information and the processing indicator information of the specified image are transmitted to the image processing apparatus.

Preferably, the image processing apparatus includes a second communication unit for performing transmission and reception of information; and an image processing unit for performing the image processing on the image information received by the second communication unit, wherein the image information and the processing indicator information of the specified image transmitted from the relay server are received, and the image processing unit performs the image processing on the image information of the specified image based on the processing indicator information.

In addition, the present invention provides a portable information communication device for use in the above-mentioned image processing system, comprising:

a communication unit for performing transmission and reception of information relayed by the relay server;

an image displaying unit for performing image displaying based on image information received by the communication unit;

an image identification information specifying unit for setting specified image identification information that identifies a displayed image, for which specification input is made based on a timing at which the image is displayed by the image displaying unit, as the specified image; and a processing indicator information creating unit for creating processing indicator information that indicates contents of processing to be performed on the specified image identified through the specification input, wherein the specified image identification information set by the image identification information specifying unit through the specification input and the processing indicator information created by the processing indicator information creating unit are transmitted from the communication unit to the relay server;

wherein the relay server relays information to be transmitted to the portable information communication device, accumulates and stores image information relayed in advance, receives the specified image identification information and the processing indicator information transmitted from the portable information communication device, extracts the image information of the specified image from the image information accumulated and stored in advance based on the received specified image identification information, and transmits the extracted image information and the processing indicator information of the specified image to the image processing apparatus; and wherein the image processing apparatus is connected to the relay server through a communication line, receives the image information and the processing indicator information of the specified image transmitted from the relay server, and performs image processing on the image information of the specified image based on the processing indicator information.

In addition, the present invention provides a relay server for use in the above-mentioned image processing system, wherein the portable information communication device performs image displaying based on received image information, sets specified image identification information that identifies, as a specified image, a displayed image for which specification input is made based on a timing at which the displayed image is displayed, creates processing indicator information that indicates contents of processing to be performed on the specified image set through the specification input, and transmits the specified image identification information and the processing indicator information to the relay server, the relay server comprising:

a communication unit for relaying and transferring, to the portable information communication device, information transmitted by specifying the portable information communication device as a transmission destination, and further transmitting predetermined information to the image processing apparatus; and a storage unit in which the image information relayed by the communication unit is accumulated and stored, wherein the image information of the specified image is extracted from the storage unit based on the specified image identification information transmitted from the portable information communication device, and the extracted image information of the specified image and the processing indicator information of the specified image are transmitted to the image processing apparatus, and wherein the image processing apparatus is connected to the relay server through a communication line, receives the image information and the processing indicator information of the specified image transmitted from the relay server, and performs image processing on the image information of the specified image based on the processing indicator information.

In addition, the present invention provides an image processing apparatus for use in the above-mentioned image processing system, wherein the portable information communication device performs image displaying based on received image information, sets specified image identification information that identifies, as a specified image, a displayed image for which specification input is made based on a timing at which the displayed image is displayed, creates processing indicator information that indicates contents of processing to be performed on the specified image set through the specification input, and transmits the specified image identification information and the processing indicator information to the relay server, and wherein the relay server relays information to be transmitted to the portable information communication device, accumulates and stores image information relayed in advance, receives the specified image identification information and the processing indicator information transmitted from the portable information communication device, extracts the image information of the specified image from the image information accumulated and stored in advance based on the received specified image identification information, and transmits the extracted image information and the processing indicator information of the specified image to the image processing apparatus, the image processing apparatus comprising:

a communication unit for performing transmission and reception of information; and an image processing unit for performing the image processing on the image information received by the communication unit, wherein the image information of the specified image and the processing indicator information of the specified image transmitted from the relay server are received, and the image processing unit performs the image processing on the image information of the specified image based on the processing indicator information.

DETAILED DESCRIPTION OF THE PREFERRED EMBODIMENTS

An image processing system, and an image processing apparatus and a portable information communication device for use in the image processing system according to the present invention will now be described in detail with reference to the accompanying drawings showing preferred embodiments thereof.

First, there will be described a first embodiment of the image processing system, and the image processing apparatus and the portable information communication device for use in the image processing system according to the present invention.

Figure 1:
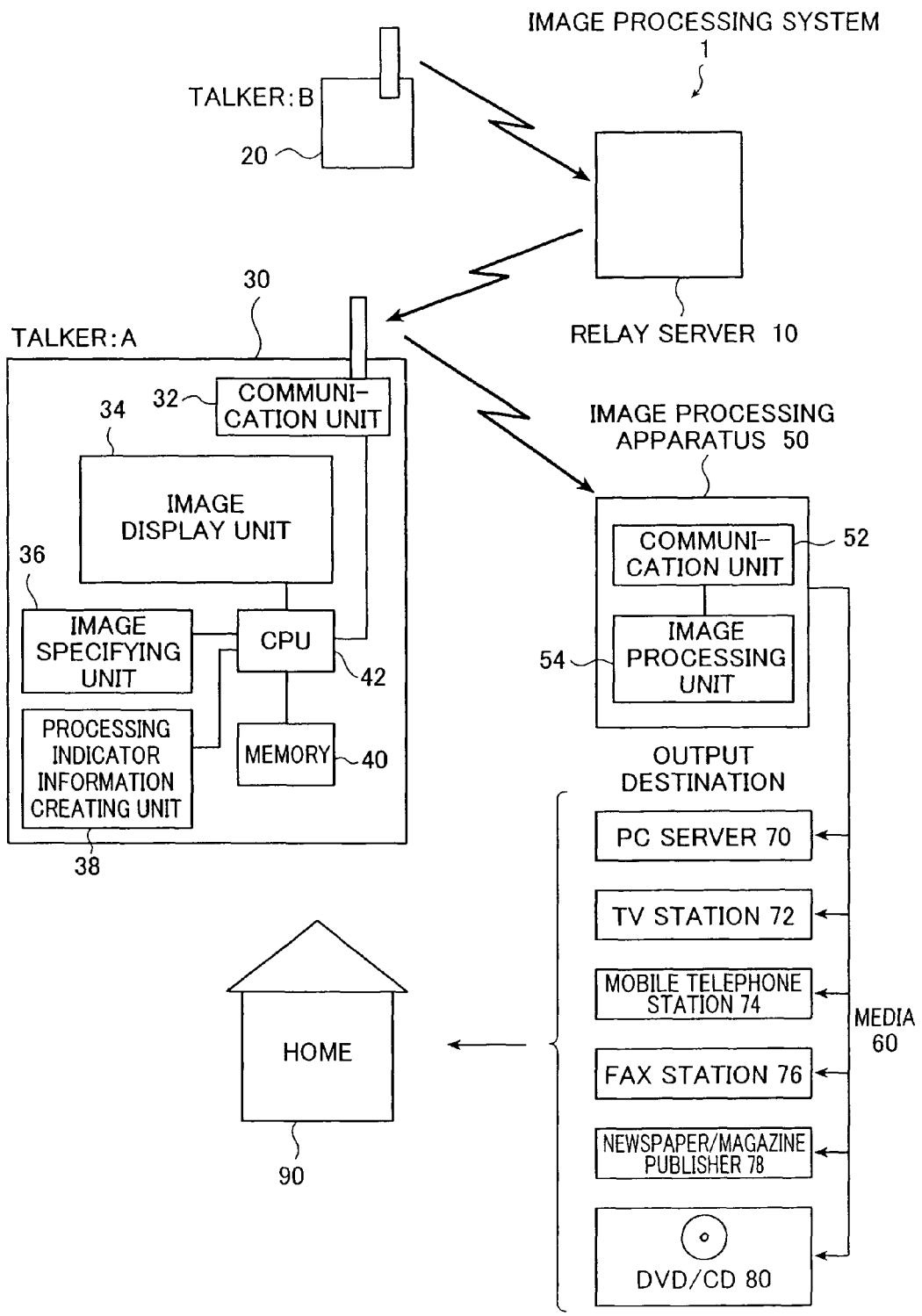
FIG. 1 is a diagram schematically showing an example of the configuration of a first embodiment of an image processing system of the present invention.

FIG. 1 is a diagram schematically showing an example of the configuration of the first embodiment of the image processing system of the present invention.

An image processing system 1 shown in FIG. 1 includes a relay server 10, a mobile telephone 20, a mobile telephone 30, an image processing apparatus 50, and media 60.

It should be noted here that the mobile telephone 30 is connected to the image processing apparatus 50 through a communication line and is also connected to the mobile telephone 20 through a communication line. Here, the communication line refers to a communication path through which information is exchanged between two or more points in a wired or wireless manner. In this embodiment, communication is performed in the wireless manner.

The relay server 10 is a computer that relays information transmitted from and received by the mobile telephone 30. In FIG. 1, the mobile telephone 30 performs communication with the mobile telephone 20 through the relay server 10.

When communicating with the mobile telephone 20 through the relay server 10, the mobile telephone 30 is capable of exchanging not only voice information but also image information. The mobile telephone 30 is the equivalent of an example of the portable information communication device of the present invention. The portable information communication device of the present invention refers to a portable device that is capable of transmitting and receiving information containing image information through the communication line, and examples thereof are a PHS, a PDA, and the like in addition to the mobile telephone.

The mobile telephone 30 includes a communication unit 32 for performing transmission and reception of information, an image display unit 34 for displaying a received image (it does not matter whether the received image is a still image or a moving image), an image specifying unit 36 for setting a desired image among images displayed on the image display unit 34 as a specified image, a processing indicator information creating unit 38 for creating processing indicator information that indicates the contents of processing to be performed on the specified image set by the image specifying unit 36, a memory 40 in which image information of the specified image is stored, and a CPU 42 that is connected to and controls each of these units.

Here, the processing indicator information refers to information that concretely indicates the contents of the processing to be performed on the specified image. For instance, the processing indicator information includes information indicating image processing that should be performed by the image processing apparatus 50 (color balance adjustment, red-eye correction, and the like), message information for making a processed image to be value-added (examples of the message information are a still image, a moving image, voice, text, and the like), print information such as the number of prints to be made and the size of the prints in the case where the prints are desired, information (such as customer information related to the customer who ordered the processed image) with reference to which the image processing is to be performed, and output indicator information with reference to which the processed image is to be outputted to an output destination.

The output indicator information refers to information with reference to which the processed image produced by performing the image processing is to be outputted. In more detail, for instance, the output indicator information is information that indicates one of the media 60 (PC server 70, for instance) as a medium for outputting the processed image to the output designation and gives an address, a mail address, a telephone/FAX number, or the like that expresses the output designation.

The image processing apparatus 50 is an example of the image processing apparatus of the present invention and includes a communication unit 52 for performing transmission and reception of information and an image processing unit 54 for performing image processing on an image received by the communication unit 52. Here, the image processing apparatus is installed in a shop, such as a processing laboratory, in which the image processing is performed. It should be noted here that the image processing apparatus 50 is connected to a printer (not shown) and, in the case where the processing indicator information received by the communication unit 52 contains print information, creates a print based on this print information.

As described above, the media 60 are each a medium for outputting the processed image (including a print) produced by the image processing apparatus 50 to the output destination. In this embodiment, as examples of the media 60, there are described the PC (Personal Computer) server 70, the TV station 72, the mobile telephone station 74, the FAX station 76, the newspaper/magazine publisher 78, and the DVD/CD 80. However, the present invention is not limited to these media.

The image processing system 1 is fundamentally constructed in the manner described above.

Hereinafter, there will be described operations of the image processing system, and the image processing apparatus and the portable information communication device for use in the image processing system of the first embodiment of the present invention.

A talker A and a talker B respectively carry the mobile telephone 30 and the mobile telephone 20 and have a conversation with each other.

During the conversation, image information of a photographed image is transmitted from the talker B to the mobile telephone 30 via the relay server 10, for instance. The transmitted image information is received by the communication unit 32. The image display is then performed on the image display unit 34 via the CPU 42.

Here, the talker A performs specification input using the image specifying unit 36 for a desired image while observing images displayed on the image displaying unit 34, thereby setting an image displayed at the timing of the specification input as a specified image. For instance, the image specifying unit 36 is structured to include an operation key on an operation panel of the mobile telephone 30, thereby allowing the talker A to set one or plural specified images by depressing the operation key as needed.

It does not matter whether the images displayed on the image display unit 34 are images that are temporarily stored in the memory 40 or images that are directly displayed on the image display unit 34 without being stored in the memory 40. In the case where the images are temporarily stored in the memory 40, it is possible to display the stored images and select a desired image from among the displayed images not only during conversation but also after the conversation (at user's convenience, for instance).

It should be noted here that the memory 40 may store the specified image so as to be distinguished from other images that are not specified.

In this manner, the image information of the specified image set by the image specifying unit 36 is stored in the memory 40.

After the specified image is set, the talker A next creates processing indicator information concerning the specified image using the processing indicator information creating unit 38. This creation is performed by depressing an operation key for information setup in accordance with a creation menu displayed on the image display unit 34. Note that it does not matter whether the creation of the processing indicator information is performed during conversation or after the conversation. In addition, the processing indicator information may be created prior to the setting of a specified image. Alternatively, each time a specified image is set, the processing indicator information may be created by adding a change to processing indicator information created in advance. The processing indicator information created by the processing indicator information creating unit 38 is stored in the memory 40 along with image information of the specified image.

When the creation of the processing indicator information is finished, the talker A next transmits the image information and the processing indicator information of the specified image to the image processing apparatus 50. Note that each time a specified image is set, the talker A may transmit image information of the specified image stored in the memory 40 and processing indicator information concerning this specified image. Alternatively, it is possible for the talker A to collectively transmit image information of a plurality of specified images and a plurality of pieces of processing indicator information concerning the plurality of specified images.

The communication unit 52 of the image processing apparatus 50 receives the image information and the processing indicator information of the specified image transmitted from the communication unit 32 of the mobile telephone 30, and sends the received image information and processing indicator information of the specified image to the image processing unit 54. In this image processing unit 54, image processing is performed on the specified image based on the processing indicator information.

In the case where the processing indicator information indicates color balance adjustment, contrast correction, distortion correction, red-eye correction, or the like as image processing that should be performed, for instance, the image processing unit 54 performs the color balance adjustment, the contrast correction, the distortion correction, the red-eye correction, or the like. Note that the image processing indicated by the processing indicator information is not limited to these adjustment and correction.

It should be noted here that it is preferable that the image processing apparatus 50 classifies image information of specified images with reference to the customer information described above so that image information related to each customer is distinguished from image information related to other customers. The image processing apparatus 50 then stores the classified image information of the specified images until the amount of the stored image information exceeds a predetermined amount or a predetermined period of time has passed, collectively performs image processing on a predetermined amount of image information of specified images or image information of specified images received in a predetermined time period in accordance with the processing indicator information, and outputs processed images produced by performing the image processing.

The processed images obtained as a result of the image processing are outputted from the image processing apparatus 50 to output destinations based on the output indicator information.

In the case where the PC server 70 among the media 60 is indicated by the output indicator information, the image information of the processed image is transmitted by regarding the PC server 70 as its output destination. In the case where the TV station 72 among the media 60 is indicated by the output indicator information, the processed image is displayed through a channel dedicated to the talker A under a private contract via the TV station, for instance. In the case where the mobile telephone station 74 among the media 60 is indicated by the output indicator information, the image information of the processed image is transmitted to the output destination via the mobile telephone station 74. In the case where the FAX station 76 among the media 60 is indicated by the output indicator information, the image information of the processed image is transmitted to the FAX station 76. In the case where the newspaper/magazine publisher 78 among the media 60 is indicated by the output indicator information, the processed image is outputted as a print image via the newspaper/magazine publisher 78. In the case where the DVD/CD 80 among the media 60 is indicated by the output indicator information, the image information of the processed image is written and recorded onto the DVD/CD It should be noted here that in the case where there is indicated the newspaper/magazine publisher 78 among the media 60, advertisement leaflets with the outputted print image are inserted in newspapers or magazines as an inserted bill, for instance. At this time, it is preferable that seals, on which addresses contained in the output indicator information are written, are affixed to the inserted advertising leaflets and the advertising leaflets are assorted, thereby making it possible for deliverymen to deliver the advertising leaflets to predetermined addresses.

By doing so, it becomes possible for the talker A to obtain the processed image produced by performing the image processing via a medium 60 specified by the talker A himself/herself.

As described above, in accordance with the first embodiment of the present invention, it is possible to select a desired image from among images received by the communication unit 32 and displayed on the image display unit 34 merely by specifying the desired image using the image specifying unit 36 (by depressing an operation key, for instance). Therefore, it is possible to easily specify the desired image among images received by the mobile telephone 30 that has a small display, is inferior in operability and throughout, and is small in memory capacity. As a result, it becomes possible to obtain a processed image (including a print) produced by performing image processing with a method that is suited to the portable information communication device such as the mobile telephone.

It should be noted here that it is preferable that in the case where it is impossible to judge whether a displayed image should be outputted as a processed image during displaying of the image, the image is temporarily specified and there is created processing indicator information indicating that index image processing should be performed on the specified image. In this case, the index image is delivered to a customer (talker A, in this embodiment), which makes it possible for the customer to select again an image that he/she wishes to output and obtain a processed image produced as a result of image processing as an output image.

It should be noted here that it is also preferable that in the case where the FAX station 76 or the newspaper/magazine publisher 78 is selected from the media 60, the FAX station or the like sends an order sheet, with which the talker A orders a commodity, along with the index image. In this case, it is possible for the customer to obtain the processed image produced by performing the image processing merely by completing the order sheet and returning it by facsimile or the like.

Here, it is also preferable that even in the case where an output request is received from the customer, the index image is outputted prior to outputting of a processed image and the outputting of the processed image is performed after the customer confirms the specified image and the processing contents.

It should be noted here that in this embodiment, the image received by the mobile telephone 30 is an image transmitted from the mobile telephone 20. However, the present invention is not limited to this and the image may be, for instance, an image received from an image delivery site that provides an image delivery service.

Next, there will be described the image processing system, and the image processing apparatus and the portable information communication device for use in the image processing system according to a second embodiment of the present invention.

Figure 2:
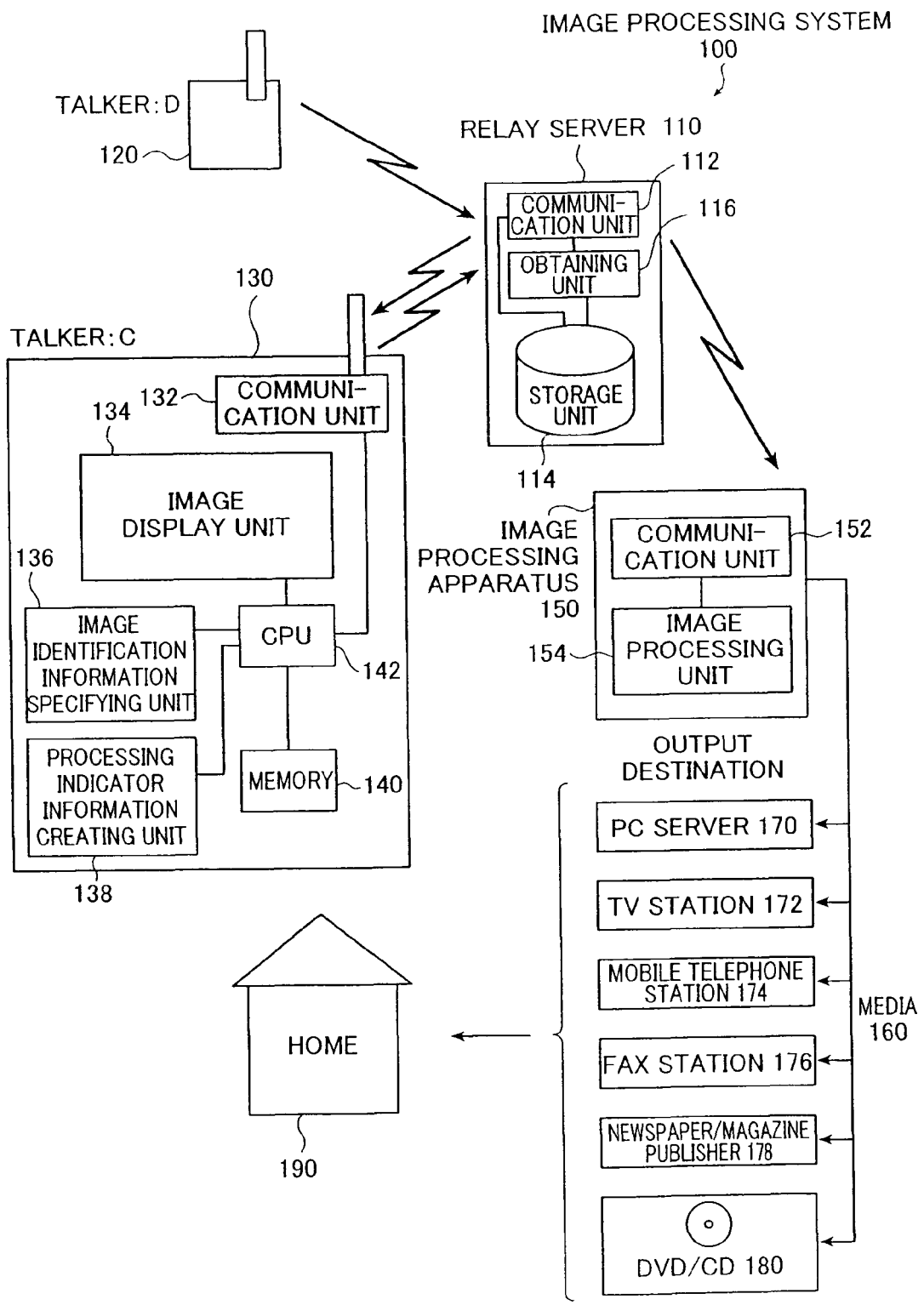
FIG. 2 is a diagram schematically showing an example of the configuration of a second embodiment of the image processing system of the present invention.

FIG. 2 is a diagram schematically showing an example of the configuration of the second embodiment of the image processing system of the present invention.

An image processing system 100 shown in FIG. 2 includes a relay server 110, a mobile telephone 120, a mobile telephone 130, an image processing apparatus 150, and media 160. FIG. 2 shows a state in which the mobile telephone 130 communicates with the mobile telephone 120.

It should be noted here that the mobile telephone 120 and the relay server 110, the mobile telephone 130 and the relay server 110, and the image processing apparatus 150 and the relay server 110 are respectively connected with each other through a communication line.

Here, the communication line refers to a communication path through which information is exchanged between two or more points in a wired or wireless manner. In this embodiment, communication is performed in the wireless manner.

When communicating with the mobile telephone 120 through the relay server 110, the mobile telephone 130 is capable of exchanging not only voice information but also image information. The mobile telephone 130 is the equivalent of an example of the portable information communication device of the present invention. The portable information communication device of the present invention refers to a portable device that is capable of transmitting and receiving information containing image information through the communication, line, and examples thereof are a PHS, a PDA, and the like in addition to the mobile telephone.

The mobile telephone 130 includes a communication unit 132 for performing transmission and reception of information via the relay server 110, an image display unit 134 for displaying a received image (it does not matter whether the received image is a still image or a moving image), an image identification information specifying unit 136 for selecting a desired image from among images displayed on the image display unit 134 as a specified image to set image identification information of the specified image, a processing indicator information creating unit 138 for creating processing indicator information that indicates the contents of processing to be performed on the specified image identified by the specified image identification information set by the image identification information specifying unit 136, a memory 140 in which the specified image identification information and the processing indicator information are stored, and a CPU 142 that is connected to and controls each of these units.

Here, the specified image identification information contains device identification information identifying the mobile telephone 130, incoming date and time information showing when reception information containing the image information was received by the communication unit 132, and address information that is created by specification input made using the image identification information specifying unit 136 based on a timing, at which an image is displayed, and identifies image information of the specified image contained in the reception information.

Further, the processing indicator information refers to information that concretely indicates the contents of the processing to be performed on the image. For instance, the processing indicator information contains information indicating desired image processing (color balance adjustment, red-eye correction, and the like), message information for converting a processed image into a value-added image (examples of the message information are a still image, a moving image, voice, text, and the like), print information such as the number of prints to be made and the site of the prints in the case where the prints are desired, information (such as customer information related to a customer that ordered the processed image) with reference to which the image processing is to be performed, and output indicator information with reference to which the processed image is to be outputted to an output destination.

The output indicator information refers to information with reference to which the processed image produced by performing the image processing is to be outputted. In more detail, for instance, the output indicator information is information that indicates one of the media 160 as a medium for outputting the processed image to the output designation (PC server 170, for instance) and gives an address, a mail address, a telephone/FAX number, or the like that expresses the output designation.

The relay server 110 is an example of the relay server of the present invention that is a computer for relaying information to be exchanged between the mobile telephones 120 and 130 and managing and storing the information. To do so, the relay server 110 includes a communication unit 112 that relays and transfers the information to be exchanged and performs transmission and reception of the information, a storage unit 114 in which the information is accumulated and stored, and an obtaining unit 116 for extracting a predetermined image from the accumulated and stored information.

Here, the information to be relayed and transferred by the relay server 110 contains the image information, the device identification information identifying the mobile telephone 130 as a transfer destination, and the like. Note that in addition to the image information, contents information or the like, such as voice information or text information, may be transferred. Also, in the storage unit 114, relay date and time information, which shows when the information was relayed, and transfer destination device identification information identifying the mobile telephone 130 as a transfer destination are accumulated and stored along with the relayed information, thereby allowing the obtaining unit 116 to extract predetermined image information from the storage unit 114.

It should be noted here that the relay date and time information shows when the information was transferred to the mobile telephone 130. Accordingly, even in the case where the relay server 110 temporarily stores the information transmitted from the mobile telephone 120, the relay date and time information gives a date and time at which the information was transferred from the relay server 110 to the mobile telephone 130.

It should also be noted here that the image information stored in the storage unit 114 is compressed in a format suited to the contents of reception information. If the image information received by the relay server 110 is information that mainly contains information of a still image, the received image information is stored in a JPEG format, for instance. On the other hand, if the image information received by the relay server 110 mainly contains information of a moving image, the received image information is stored in an MPEG format, for instance.

The image processing apparatus 150 is an example of the image processing apparatus of the present invention and includes a communication unit 152 for performing transmission and reception of various kinds of information and an image processing unit 154 for performing image processing on an image received by the communication unit 152. Here, the image processing apparatus is installed in a shop, such as a processing laboratory, in which the image processing is performed.

It should be noted here that the image processing apparatus 150 is connected to a printer (not shown) and, in the case where the processing indicator information received by the communication unit 152 contains print information, creates a print based on this print information.

Also, the image received by the communication unit 152 is an image that has been encoded and compressed, so that the image processing unit 154 performs decoding of the received image before performing the image processing.

As described above, the media 160 are each a medium for outputting the processed image (including a print) produced by the image processing apparatus 150 to the output destination. In this embodiment, as examples of the media 160, there are described the PC server 170, the TV station 172, the mobile telephone station 174, the FAX station 176, the newspaper/magazine publisher 178, and the DVD/CD 180. However, the present invention is not limited to these media.

The image processing system 100 is fundamentally constructed in the manner described above.

Hereinafter, there will be described operations of the image processing system, and the image processing apparatus and the portable information communication device for use in the image processing system of a second embodiment of the present invention.

A talker C and a talker D respectively carry the mobile telephone 130 and the mobile telephone 120 and have a conversation with each other.

During the conversation, image information of a photographed image is transmitted from the talker D to the mobile telephone 130 via the relay server 110, for instance. Information containing the image information transmitted from the mobile telephone 120 is relayed and transferred by the communication unit 112 of the relay server 110, and is received by the communication unit 132 of the mobile telephone 130. Also, the information containing the image information transmitted from the mobile telephone 120 and received by the communication unit 112 of the relay server 110 is subjected to appropriate compression processing in accordance with the image information and is stored in the storage unit 114.

It should be noted here that as described above, in the storage unit 114, the relay date and time information, which shows when the information (such as the image information) was relayed, and the transfer destination device identification information, which identifies the mobile telephone 130 as the transfer destination, are accumulated and stored along with the relayed image information.

The communication unit 132 of the mobile telephone 130 receives the image information transmitted from the mobile telephone 120 and transferred by the relay server 110. Then, the received image information is sent to the image display unit 134 via the CPU 142 and image displaying is performed.

Here, the talker C performs specification input using the image identification information specifying unit 136 for a desired image among images displayed by the image displaying unit 134, thereby setting image identification information that identifies an image displayed at the timing of the specification input as a specified image. For instance, the image identification information specifying unit 136 includes an operation key on an operation panel of the mobile telephone 130, thereby allowing the talker C to set the specified image identification information by depressing the operation key.

The specified image identification information identifying the specified image is automatically created when the specification input is made using the image identification information specifying unit 136, and the device identification information identifying the mobile telephone 130 and the incoming date and time information showing when the specified image was received are automatically added to and set in the address information identifying the image information of the specified image contained in the reception information.

It should be noted here that the setting of the specified image identification information is performed during conversation.

The specified image identification information set by the image identification information specifying unit 136 is stored in the memory 140.

After the specified image identification information identifying the specified image is set, the talker C next creates processing indicator information concerning the specified image using the processing indicator information creating unit 138. This creation is performed through setting by depressing operation keys in accordance with a creation menu displayed on the image display unit 134. Note that it does not matter whether the creation of the processing indicator information is performed during conversation or after the conversation. In addition, the processing indicator information may be created in advance. Alternatively, each time a specified image is set, the processing indicator information may be created by adding a change to processing indicator information created in advance. The processing indicator information created by the processing indicator information creating unit 138 is stored in the memory 140 along with the specified image identification information.

When the creation of the processing indicator information is finished, the talker C next transmits the specified image identification information identifying the specified image and the processing indicator information to the relay server 110. Note that each time the specified image identification information is set, the talker C may transmit the specified image identification information and the processing indicator information concerning the specified image identified by the specified image identification information. Alternatively, it is possible for the talker C to collectively transmit a plurality of pieces of specified image identification information and a plurality of pieces of processing indicator information concerning a plurality of specified images identified by the plurality of pieces of specified image identification information. Note that a period of time, during which the image information is stored in the relay server 110, is limited, so that it is required that the image information is transmitted before the storage time period has passed.

The communication unit 112 of the relay server 110 receives the specified image identification information and the processing indicator information transmitted from the communication unit 132 of the mobile telephone 130, and sends the specified image identification information thus received to the obtaining unit 116.

The obtaining unit 116 extracts information containing image information of the specified image by checking the incoming date and time information and the device identification information identifying the mobile telephone 130 contained in the specified image identification information against the relay date and time information and the transfer destination device identification information accumulated and stored in the storage unit 114. The obtaining unit 116 further extracts the image information of the specified image using the address information contained in the specified image identification information.

It should be noted here that the obtaining unit 116 may narrow down information stored in the storage unit 114 by checking the device identification information identifying the mobile telephone 130 against the transfer destination device identification information, and extract the information containing the specified image from the remaining information by checking the incoming date and time information against the relay date and time information. Also, the obtaining unit 116 may narrow down information stored in the storage unit 114 by checking the incoming date and time information against the relay date and time information, and extract the information containing the specified image from the remaining information by checking the device identification information identifying the mobile telephone 130 against the transfer destination device identification information.

It should be noted here that when the relay date and time information is checked against the incoming date and time information, even if the incoming date and time information does not completely coincide with the relay date and time information, a matching result is obtained if a difference of the incoming date and time information from the relay date and time information falls within an allowable time range.

The image information of the specified image extracted by the obtaining unit 116 in this manner and the processing indicator information concerning the specified image transmitted from the mobile telephone 130 are transmitted from the communication unit 112 to the image processing apparatus 150.

It should be noted here that each time there is extracted image information of a specified image, the relay server 110 may transmit the image information and the like to the image processing apparatus 150. Alternatively, the relay server 110 may collectively transmit a plurality of pieces of image information and the like to the image processing apparatus 150 by storing a plurality of pieces of extracted image information and the like concerning a plurality of specified images until a predetermined period of time has passed or until the amount of the stored information reaches a predetermined amount.

The communication unit 152 of the image processing apparatus 150 receives the image information of the specified image and the processing indicator information transmitted from the communication unit 112 of the relay server 110.

In the image processing unit 154, image processing is performed on the image information of the specified image received by the communication unit 152 of the image processing apparatus 150, based on the processing indicator information.

In the case where the processing indicator information indicates color balance adjustment, contrast correction, distortion correction, red-eye correction, or the like as image processing that should be performed, for instance, the image processing unit 154 performs the color balance adjustment, the contrast correction, the distortion correction, the red-eye correction, or the like. Note that the image processing is not limited to these adjustment and correction.

It should be noted here that it is preferable that the image processing apparatus 150 classifies image information of specified images so that image information related to each customer is distinguished from image information related to other customers. The image processing apparatus 150 then stores the classified image information of the specified images until the amount of the stored image information exceeds a predetermined amount or a predetermined period of time has passed, and collectively performs image processing on a predetermined amount of image information of specified images or image information of specified images received in a predetermined time period.

The image information of the processed images obtained as a result of the image processing are transmitted via the communication unit 152 to be outputted to a medium 60 specified by the output indicator information.

In the case where the PC server 170 among the media 160 is indicated by the output indication information, the image information of the processed image is transmitted by regarding the PC server 170 as its output destination. In the case where the TV station 172 among the media 160 is indicated by the output indicator information, the processed image is displayed' through a channel dedicated to the talker C under a private contract via the TV station, for instance. In the case where the mobile telephone station 174 among the media 160 is indicated by the output indicator information, the image information of the processed image is transmitted to the output destination via the mobile telephone station 174. In the case where the FAX station 176 among the media 160 is indicated by the output indicator information, the image information of the processed image is transmitted to the FAX station 176. In the case where the newspaper/magazine publisher 178 among the media 160 is indicated by the output indicator information, the processed image is outputted as a print image via the newspaper/magazine publisher 178. In the case where the DVD/CD 180 among the media 160 is indicated by the output indicator information, the image information of the processed image is written and recorded onto the DVD/CD 180.

It should be noted here that in the case where there is indicated the newspaper/magazine publisher 178 among the media 160, advertisement leaflets with the outputted print image are inserted in newspapers or magazines, for instance. At this time, it is preferable that seals, on which addresses contained in the output indicator information are written, are affixed to the advertising leaflets and the advertising leaflets are assorted, thereby making it possible for deliverymen to deliver the advertising leaflets to predetermined addresses.

By doing so, it becomes possible for the talker C to obtain the processed image produced by performing the image processing via a medium 160 specified by the talker C himself/herself.

As described above, in accordance with the second embodiment of the present invention, it is possible to set image identification information identifying a desired image among images displayed on the display unit 134 of the mobile telephone 130 merely by specifying the image identification information using the image identification information specifying unit 136 (by depressing a button, for instance). Therefore, it is possible to easily specify the image identification information identifying a desired image among images obtained by a portable information communication device, such as the mobile telephone 130, that has a small display, is inferior in operability and throughput, and is small in memory capacity, and to obtain a processed image (including a print order) produced by performing image processing with a method that is suited to the portable information communication device. In addition, in this embodiment, an image is stored in the relay server 110 and the portable information communication device, such as the mobile telephone 130, is not required to store the image, so that no load is placed on the portable information communication device that uses a memory whose capacity is small.

It should be noted here that it is preferable that in the case where it is impossible to judge whether a displayed image should be outputted or not as a processed image during displaying of the image, the image is temporarily specified and there is created processing indicator information indicating that index image processing should be performed on the specified image. In this case, the index image is delivered to a customer (talker C, in this embodiment), which makes it possible for the customer to select again an image that he/she wishes to output and obtain a processed image produced as a result of image processing as an output image.

It should be noted here that it is also preferable that in the case where the FAX station 176 or the newspaper/magazine publisher 178 is selected from the media 160, the FAX station or the like sends an order sheet, with which the talker C orders a commodity, along with the index image. In this case, it is possible for the customer to obtain the processed image produced by performing the image processing merely by completing the order sheet and returning it by facsimile or the like.

Here, it is also preferable that even in the case where an output request is received from the customer, the index image is outputted prior to outputting of a processed image and the outputting of the processed image is performed after the customer confirms the specified image and the processing contents.

It should be noted here that in this embodiment, the image received by the mobile telephone 130 is an image transmitted from the mobile telephone 120. However, the present invention is not limited to this and the image may be, for instance, an image received from an image delivery site that provides an image delivery service.

Incidentally, communication dates and times and communication destinations are written on a communication record list issued by a telephone company as a detailed statement along with a bill. In this system that uses the communication line, an image column may be newly provided on the communication record list and an image related to each conversation may be synthesized and outputted as a processed image. In this case, it becomes possible to give an entertainment property to the detailed statement. Note that it is preferable that the image printed in the image column is automatically selected by the relay server of the present invention or the like based on communication history information giving communication destinations, communication contents, communication dates and times, and the like.

Also, it is preferable that the selected image is transmitted to the telephone company having an image processing apparatus and a printer from the relay server or the like.

In the case where an image of a party on the other end (talker D in the case of a detailed statement issued to the talker C) is printed in the image column, for instance, an image (replacement image) of each conversation destination is registered in the relay server or the like in advance, the relay server or the like extracts the replacement image (image of the talker D) in accordance with the conversation destination, and transmits the extracted image to the telephone company along with other communication records. As a result of these operations, at the telephone company having the image processing apparatus and the printer, it is possible to perform synthesizing processing on the replacement image on the communication record list (for the talker C) and to deliver the communication record list with the image.

Also, in the case where an image related to conversation contents is printed in the image print column, a keyword and an image corresponding to the keyword are registered in the relay server or the like in advance, for instance. Then, in the case where the keyword is used for conversation, the relay server or the like extracts the image corresponding to the keyword and transmits the extracted image to the telephone company along with other communication records. As a result of these operations, at the telephone company having the image processing apparatus and the printer, it is possible to perform synthesizing processing on an image associated with the contents of the conversation on the communication record list and to deliver the communication record list with the image.

Also, in the case where an image related to a conversation date and time is printed in the image print column, an image specified by the communication date and time is registered in the relay server or the like, for instance. Then, the relay server or the like extracts the registered image based on the communication date and time and transmits the extracted image to the telephone company along with other communication records. As a result of these operations, at the telephone company having the image processing apparatus and the printer, it is possible to perform synthesizing processing on the image related to the communication date and time on the communication record list and to deliver the communication record list with the image. In more detail, for instance, if the weather at the time of communication is fine, it is possible to print a mark representing this fine weather in the image column. Also, if a favorite professional baseball team or player or the like won a game at the communication date, it is possible to print the mark of the favorite team or a portrait of the favorite player in the image column.

By providing the communication record list with the image column and printing various images related to conversation in this manner, it becomes possible to give an entertainment property to the detailed statement sent from the telephone company every month. Therefore, it becomes possible to convert just a bill or detailed statement into a value-added conversation diary.

By the way, in the image processing system of the present invention described above, it is also possible to contain message information (such as a still image, a motion image, voice, or text) in the processing indicator information and perform value-added image processing on a specified image. In the case where a face of a person is contained in the specified image, it is also preferable that a mark emphasizing the feeling of the person in the specified image (mark representing "impatience", "surprise", "anger", "pathos", "affection", or "pleasure", for instance) is synthesized with the specified image through synthesizing processing, thereby enhancing the entertainment property, as disclosed in JP 2002-77592 A.

It should be noted here that such synthesizing processing may be performed by registering voice data, expressions, and gestures of each customer in advance, registering synthesizing processing patterns for synthesizing marks indicating "impatience", "surprise", and the like corresponding to the registered voice data or the like in advance, comparing voice data attached to the specified image or the expression or gesture of a person in the specified image with the registered voice data or the like, and selecting one of the synthesizing processing patterns.

It should be noted here that instead of the image processing apparatus, the portable information communication device or the relay server may perform the synthesizing processing.

In this embodiment described above, relay data is stored in the relay server 110. However, the present invention is not limited to this and the relay data may be transferred to a transmission destination specified by a customer (talker C, for instance) on the reception side as it is. In this case, it is preferable that information giving the transmission destination is registered for each customer (talker, for instance) in advance and is recorded in a database of a relay station (provider), that is, in the storage unit 114 of the relay server 110. By doing so, the relay data received by the relay server 110 is automatically transferred to a registered transmission destination. As a result, there is provided an effect that the relay server 110 at the relay station is not required to store all of relay data and therefore it becomes unnecessary to install a mass storage apparatus.

A first example of the transmission destination is a photo studio/processing laboratory or the like with which the customer contracts. In this case, a storage unit is installed in the shop. Here, the image processing apparatus 150 side may have the storage unit or the storage unit may be separately provided.

Next, as the second example, the transmission destination may be a personal computer (PC) owned by the customer himself/herself on the reception side, a PC possessed by a group (club or the like, for instance) to which the customer belongs, or a plurality of distributed PCs. In these PCs, data transferred from the relay server 110 is recorded (temporarily stored) as it is. Following this, the transferred data is transmitted to the image processing apparatus 150 side in predetermined cycles or at appropriate (preferred) timings, thereby requesting image processing.

Also, even in the case where the relay data relayed by the relay server 110 is stored in the relay server 110 or at the transmission destination, it is preferable that various modes for storing the relay data are prepared. In particular, in the case where a user will be charged in accordance with the amount of stored data when the relay data is stored in the relay server 110, for instance, it is preferable that there are prepared various modes of storing the relay data. In this case, it is preferable that information showing a storing mode specified in advance is registered in a database (storage unit 114) of the relay server 110.

As the prepared storing modes, it is possible to cite the following examples. A first example is a mode in which it is possible to specify whether all of the relay data is to be stored or is not to be stored.

A second example is a mode in which each time an incoming call arrives, it is possible for the customer on the reception side to individually perform manual setting for the incoming call.

A third example is a mode in which transmission sides (specific friends/agencies or the like) are specified and registered in advance and all data received from the transmission sides is recorded.

A fourth example is a mode in which the relay data is first accumulated in the memory 140 of the mobile telephone 130, a recording request signal is automatically issued when there occurs memory capacity overflow, and the relay data is automatically recorded in the relay server 110 afterward.

In the case where the relay data is stored or recorded in the relay server 110 or at a transfer destination, it is preferable that the image quality of an image transmitted to a reception terminal (mobile telephone 130) is changed from the image quality of an image recorded in the relay server 110 or an image outputted to the transmission destination.

For instance, as a first processing mode, it is preferable that the amount of communication data is reduced by lowering the quality of transmission contents (such as a transmission image) from the relay server 110 to the mobile telephone 130 on the reception side. This mode is used in the case where the details are checked using a recorded data version and therefore there arises no problem even if the image quality on the screen of the mobile telephone 130 is lowered and an image of moderate image quality is displayed.

For instance, when the first processing mode is set, the relay server 110 records an image from the transmission side (mobile telephone 120, for instance) in the storage unit 114 or the recording unit or transmits the image to the transmission destination as it is. On the other hand, when transmitting image data to the mobile telephone 130 on the reception side, the relay server 110 reconstructs the image data by increasing the compression ratio and transmits the reconstructed data having the high compression ratio to the mobile telephone 130.

Also, as a second processing mode, the amount of recorded data may be reduced by inversely lowering the image quality of the image data recorded (stored) in the relay server 110 or transmitted to the transmission destination. This mode is set in the case where there arises no problem so long as it is possible to understand the outline of an image using the recording data version or in the case where it is desired to reduce the amount of recorded data.

Further, as a third processing mode, in order to reduce the data amount, manipulations such as trimming (only the center portion of a picture is stored), conversion into a monochrome image, conversion into a line drawing, conversion into an animation-like image (simplification of color and gradation), or the like may be performed, aside from the control of the compression ratio. In this case, it is possible to use various methods of further reducing the amount of information.

It is preferable that it is possible to select, register, and set one of the first to third processing modes for each customer. Also, it is preferable that these modes are switchably specified and registered in accordance with the transmission side (specific friend or shop, for instance). In this case, it becomes possible to register a process, in which an image from a specific friend is maintained as a high-quality image, or a process in which the image quality on the mobile telephone side is inversely enhanced, for instance.

Figure 3:
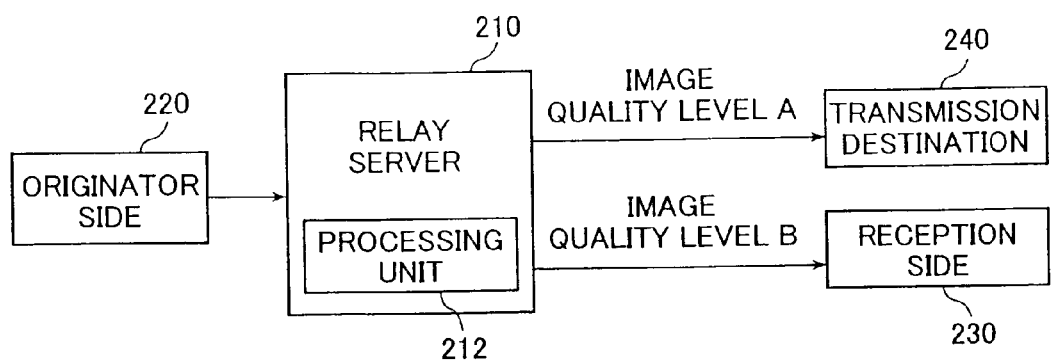
FIG. 3 is a diagram schematically showing an example of the configuration of still another embodiment of the image processing system of the present invention.

Alternatively, as shown in FIG. 3, one of two image quality levels (high/low) or one of three image quality levels (high/middle/low) may be manually specified, for instance.

In FIG. 3, there is illustrated an example where an image transmitted from an originator side terminal (mobile telephone or the like) 220 is received by a relay server 210 and the image quality level thereof is set at one of two levels (an image quality level A and an image quality level B) using the processing unit 212 in accordance with whether the transmission destination is a reception side terminal (mobile telephone or the like) 230 or a transmission destination (customer's PC or the like).

As a method of identifying a specified image, it is also possible to cite the following examples.

First, in the case where a received image is a moving image, for instance, it is possible to switchably select one of specifying methods with each of which the whole of the moving image is set as a recording target, a section (start frame to end frame) is set as the recording target, or a frame is set as the recording target. Note that, in the case of the moving image, it is preferable that audio data at a corresponding timing is also recorded.

Also, the specification may be performed without using the device identification information identifying the portable information communication device, such as a mobile telephone, and the incoming date and time information.

For instance, unique image identification information K1 may be added to a transmission image by a transmission side device and a reception side device may read the image identification information from a specified image and transmit the read information to the relay server.

Here, K1 is a combination of a mobile telephone ID on the originator side, a date, and a number that identifies the transmission image among all images originated within the date.

On the reception side device, it is possible to create address information K2 by combining a frame specification type with frame range specification, to create scene specification information K3 by combining K1 with K2, and to transmit the information to the relay server.

It should be noted here that it is possible to specify a plurality of sections or frames for one moving image file.

For instance, it is possible to set the frame specification type contained in the address information K2 at "0" (specifying the whole of the moving image file), "1" (specifying a section set using a specification start button and a specification end button), or "2" (specifying a frame set using a specifying button).

Also, the frame range specification contained in the address information K2 becomes as follows, for instance. When the frame specification type is "0", there exists no data. Also, when the frame specification type is "1", there exists data in specified sections ((n1, n2), (n3, n4), . . . ). Further, when the frame specification type is "2", there exists data in specified frames (n1, n2, . . . ) ("n" is a number assigned by counting the total number of frames by setting the number assigned to the start frame of the image file at "0").

It is possible for the relay server to search for the specified image based on the image identification information K1 contained in the scene specification information K3 and to specify a scene based on the address information K2.

Aside from this, it is possible to use a method with which not the originator side device but the relay server side creates the image identification information K1 on its own terms, attaches this information to the image, and relays and transmits the information. For instance, K1 is a combination of a relay server ID, a date, and a number that identifies an image among all processed images.

Also, it is preferable that it is possible to customize the contents of image processing performed by the image processing apparatus for each customer.

Here, the contents of the image processing customized for each customer is stored in a customer database on the image processing apparatus side, thereby recoding a mode set for each customer. Here, it is preferable that a customer is capable of selecting a mode in units of contractors (there is set a mode common to all members of a family in this case) or in units of recipients (mode selection is performed for each member of a family in this case).

As a first example, with the customer indicator information, it is possible to specify whether there will be performed processing for converting conversation voice (transmitted and received voice) into text data through text conversion and attaching the text data to an image.

At this time, it is possible to set the size of the image and the size, font, color, and the like of the text by specifying them in advance in accordance with individual's preferences. For a little child, it is also possible to use plain words or to synthesize a character image. Further, it is possible to synthesize the text in a telop manner or in a subtitle manner, which is in particular effective in the case of a moving image or the like.

Next, as a second example, there may be changed an order in which communication history data of respective members constituting a family is displayed, or the communication history data may be stored in different files. Alternatively, only the communication history data concerning adults may be encrypted using registered keywords, for instance.

As a third example, the compression ratio of an image may be optimized in accordance with the output form and size specification of recorded data. For instance, in the case where there arises no problem even if the image quality is low or in the case where a small-sized image is sufficient, the image compression ratio may be increased, thereby reducing the data amount.

As a fourth example, the image compression ratio is increased or decreased in accordance with whether an image comes from a registered and specified party on the other end/originator. For instance, a low compression ratio is set for a conversation image from a close friend or an image from a favorite site, thereby outputting the image with fine, image quality.

As a fifth example, it is also possible to specify manipulations such as trimming, conversion into a monochrome image, conversion into a line drawing, conversion into an animation-like image (simplification of color and gradation), conversion into a painting-like image, or the like.

In the examples described above, the reception side user specifies the form in which the transmission side data received from the transmission side device is stored. However, the present invention is not limited to this and there may be provided a transmission side data storage service in which the user on the transmission side himself/herself specifies the storage form of the transmission side data to be transmitted.

Even in this case, the transmission data is first received by the transmission relay station (relay server), is then processed by the image processing apparatus, and is finally transmitted to a home.

It should be noted here that even in this case, like at the time of reception, it is possible to specify a recording target image through an operation by which the whole, a section (section specification), or a frame of transmission data during conversation is specified. In addition, it is possible to specify the final output form. Further, it is possible to perform synthesizing with reception data at the time of conversation.

In the above examples, transmission data is stored during conversation. However; the present invention is not limited to this and there may be provided a service in which the transmission data is stored at a timing other than conversation.

For instance, if there is set a mode in which a home is specified as a party on the other end of conversation and there is selected a mode in which only image storing is performed, transmission data is first transmitted to the relay station (relay server), is then processed by the image processing apparatus, and is finally delivered to the home in a specified form. It is also possible to specify the final output form.

If an image photographed away from home using a digital camera is externally inputted into a mobile telephone and is transmitted from the mobile telephone by specifying a home as a transmission destination and specifying DVD output as an output form, for instance, the photographed image is subjected to image processing (density correction and color correction, for instance) by the image processing apparatus and is recorded on a DVD, which is then mailed to the home.

In this example, the home is specified as the output designation. However, it is also possible to set a place other than the home as the output destination. In addition, it is possible to set a plurality of places at the same time.

If a telephone of an acquaintance is specified (it is possible to specify the telephone of a party on the other end) and there is set the mode in which only the image storage is performed, for instance, it is not necessarily to have a conversation with the acquaintance (party on the other end). Therefore, it also becomes possible to, without having a conversation, perform image conversion, to produce a DVD on which the image has been recorded, and to send the DVD to the acquaintance by mail.

As described above, it is possible to record a photographed image on a DVD in the same route as above and to mail the DVD to an acquaintance or a party on the other end. Note that it is sufficient that the address of the acquaintance or the party on the other end is automatically found with reference to a communication designation telephone number. Here, it is preferable that as to the image processing apparatus, the relay server finds a processing laboratory (photo shop) nearest to the address of the party on the other end through automatic retrieval.

The image processing system, and the image processing apparatus and the portable information communication device for use in the image processing system according to the present invention have been described in detail above. However, the present invention is not limited to the embodiments described above. That is, needless to say, it is possible to make various kinds of modifications and changes without departing from the gist of the present invention.

As described in detail above, in accordance with the present invention, it is possible to perform image processing (including a print order) on a desired image specified from among images obtained by a portable information communication device, such as a mobile telephone, which has a small display, is inferior in operability and throughput, and is small in memory capacity in comparison with a personal computer, with a method that is suited to the portable information communication device.

What is claimed is:

1. An image processing system comprising:
a portable information communication device;
a relay server; and
an image processing apparatus,
wherein said portable information communication device performs image displaying based on received image information, sets specified image identification information that identifies, as a specified image, a displayed image for which specification input is made based on a timing at which the displayed image is displayed, creates processing indicator information that indicates contents of processing to be performed on the specified image set through the specification input, and transmits the specified image identification information and the processing indicator information to said relay server;
said relay server relays information to be transmitted to said portable information communication device, accumulates and stores image information relayed in advance, receives the specified image identification information and the processing indicator information transmitted from said portable information communication device, extracts the image information of the specified image from the image information accumulated and stored in advance based on the received specified image identification information, and transmits the extracted image information and the processing indicator information of the specified image to said image processing apparatus; and
said image processing apparatus is connected to said relay server through a communication line, receives the image information and the processing indicator information of the specified image transmitted from said relay server, and performs image processing on the image information of the specified image based on the processing indicator information.

2. The image processing system according to claim 1,
wherein said specified image identification information transmitted from said portable information communication device to said relay server contains device identification information identifying said portable information communication device, incoming date and time information showing when reception information containing the image information of the specified image was received, and address information that is created through the specification input made based on the timing, at which the displayed image is displayed and identifies the image information of the specified image contained in the reception information,
a storage unit of said relay server accumulates and stores relay date and time information showing when the information containing the image information to be transferred to said portable information communication device was relayed and transfer destination device identification information identifying said portable information communication device as a transfer destination along with the relayed image information, and
said relay server extracts the information containing the image information of the specified image by checking the incoming date and time information and the device identification information contained in the specified image identification information against the relay date and time information and the transfer destination device identification information, and further extracts the image information of the specified image with reference to the address information.

3. The image processing system according to claim 1, wherein said processing indicator information contains output indicator information with reference to which a processed image obtained by performing the image processing is outputted to an output destination, and said image processing apparatus outputs the processed image of the specified image based on the output indicator information.

4. The image processing system according to claim 1, wherein image quality of a transmission image to be transmitted from said relay server to said portable information communication device is changed from image quality of a recorded image based on the image information accumulated and recorded in said relay server or the processed image to be outputted to the output destination.

5. The image processing system according to claim 1, wherein said portable information communication device includes:

a communication unit for performing transmission and reception of information relayed by said relay server;

an image displaying unit for performing the image displaying based on the image information received by said communication unit;

an image identification information specifying unit for setting the specified image identification information that identifies the displayed image, for which the specification input is made based on the timing at which the displayed image is displayed by said image displaying unit, as the specified image; and a processing indicator information creating unit for creating the processing indicator information that indicates the contents of the processing to be performed on the specified image identified through the specification input, wherein the specified image identification information set by said image identification information specifying unit through the specification input and the processing indicator information created by said processing indicator information creating unit are transmitted from said communication unit to said relay server.

6. The image processing system according to claim 1, wherein said relay server includes:

a communication unit for relaying and transferring, to said portable information communication device, information transmitted by specifying said portable information communication device as a transmission destination, and further transmitting predetermined information to said image processing apparatus; and a storage unit in which image information relayed by said communication unit is accumulated and stored, wherein said image information of the specified image is extracted from the storage unit based on the specified image identification information transmitted from said portable information communication device, and said extracted image information and said processing indicator information of said specified image are transmitted to said image processing apparatus.

7. The image processing system according to claim 1, wherein the image processing apparatus includes:

a communication unit for performing transmission and reception of information; and an image processing unit for performing the image processing on the image information received by said communication unit, wherein said image information and said processing indicator information of said specified image transmitted from said relay server are received, and said image processing unit performs the image processing on the image information of the specified image based on the processing indicator information.

8. A portable information communication device for use in an image processing system which includes the portable information communication device, a relay server, and an image processing apparatus, said portable information communication device comprising:

a communication unit for performing transmission and reception of information relayed by the relay server;

an image displaying unit for performing image displaying based on image information received by the communication unit;

an image identification information specifying unit for setting specified image identification information that identifies a displayed image, for which specification input is made based on a timing at which the image is displayed by the image displaying unit, as the specified image; and a processing indicator information creating unit for creating processing indicator information that indicates contents of processing to be performed on the specified image identified through the specification input, wherein the specified image identification information set by the image identification information specifying unit through the specification input and the processing indicator information created by the processing indicator information creating unit are transmitted from the communication unit to the relay server;

wherein said relay server relays information to be transmitted to said portable information communication device, accumulates and stores image information relayed in advance, receives the specified image identification information and the processing indicator information transmitted from said portable information communication device, extracts the image information of the specified image from the image information accumulated and stored in advance based on the received specified image identification information, and transmits the extracted image information and the processing indicator information of the specified image to said image processing apparatus; and wherein said image processing apparatus is connected to said relay server through a communication line, receives the image information and the processing indicator information of the specified image transmitted from said relay server, and performs image processing on the image information of the specified image based on the processing indicator information.

9. A relay server for use in an image processing system which includes a portable information communication device, the relay server and an image processing apparatus, wherein said portable information communication device performs image displaying based on received image information, sets specified image identification information that identifies, as a specified image, a displayed image for which specification input is made based on a timing at which the displayed image is displayed, creates processing indicator information that indicates contents of processing to be performed on the specified image set through the specification input, and transmits the specified image identification information and the processing indicator information to said relay server, said relay server comprising:
- a communication unit for relaying and transferring, to said portable information communication device, information transmitted by specifying said portable information communication device as a transmission destination, and further transmitting predetermined information to said image processing apparatus; and
- a storage unit in which the image information relayed by said communication unit is accumulated and stored,
- wherein said image information of the specified image is extracted from said storage unit based on the specified image identification information transmitted from said portable information communication device, and the extracted image information of the specified image and the processing indicator information of the specified image are transmitted to the image processing apparatus, and
- wherein said image processing apparatus is connected to said relay server through a communication line, receives the image information and the processing indicator information of the specified image transmitted from said relay server, and performs image processing on the image information of the specified image based on the processing indicator information.

10. An image processing apparatus for use in an image processing system which includes a portable information communication device, a relay server and the image processing apparatus, wherein said portable information communication device performs image displaying based on received image information, sets specified image identification information that identifies, as a specified image, a displayed image for which specification input is made based on a timing at which the displayed image is displayed, creates processing indicator information that indicates contents of processing to be performed on the specified image set through the specification input, and transmits the specified image identification information and the processing indicator information to said relay server, and wherein said relay server relays information to be transmitted to said portable information communication device, accumulates and stores image information relayed in advance, receives the specified image identification information and the processing indicator information transmitted from said portable information communication device, extracts the image information of the specified image from the image information accumulated and stored in advance based on the received specified image identification information, and transmits the extracted image information and the processing indicator information of the specified image to said image processing apparatus, said image processing apparatus comprising:
- a communication unit for performing transmission and reception of information; and
- an image processing unit for performing the image processing on the image information received by said communication unit,
- wherein said image information of the specified image and said processing indicator information of the specified image transmitted from said relay server are received, and the image processing unit performs the image processing on the image information of the specified image based on the processing indicator information.

11. An image processing system comprising:
a portable information communication device that displays images based on received image information, sets a displayed image, for which specification input is made based on a timing at which the displayed image is displayed, as a specified image, creates processing indicator information that indicates contents of processing to be performed on the specified image set through said specification input, and transmits image information and said processing indicator information of said specified image, wherein said image information is transmitted by one user and received by another user during a conversation between at least two users using portable communication device capable of transmitting and receiving image information; and
an image processing apparatus that is connected to said portable information communication device through a communication line, receives said image information and said processing indicator information of said specified image transmitted from said portable information communication device, and performs image processing on the received image information of said specified image based on the received processing indicator information.

12. An image processing system comprising:
a portable information communication device that displays images based on received image information, sets a displayed image, for which specification input is made based on a timing at which the displayed image is displayed, as a specified image, creates processing indicator information that indicates contents of processing to be performed on the specified image set through said specification input, and transmits image information and said processing indicator information of said specified image; and
an image processing apparatus that is connected to said portable information communication device through a communication line, receives said image information and said processing indicator information of said specified image transmitted from said portable information communication device, and performs image processing on the received image information of said specified image based on the received processing indicator information, wherein said processing indicator information is created during a conversation or after a conversation between at least two users using portable communication device capable of transmitting and receiving image information.

13. An image processing system comprising:
a portable information communication device that displays images based on received image information, sets a displayed image, for which specification input is made based on a timing at which the displayed image is displayed, as a specified image, creates processing indicator information that indicates contents of processing to be performed on the specified image set through said specification input, and transmits image information and said processing indicator information of said specified image; and
an image processing apparatus that is connected to said portable information communication device through a communication line, receives said image information and said processing indicator information of said specified image transmitted from said portable information communication device, and performs image processing on the received image information of said specified image based on the received processing indicator information, and
wherein said portable information communication device collectively transmits the image information of a plurality of specified images and a plurality of processing indicator information concerning a plurality of specified images.

14. An image processing system comprising:

a portable information communication device that displays images based on received image information, sets a displayed image, for which specification input is made based on a timing at which the displayed image is displayed, as a specified image, creates processing indicator information that indicates contents of processing to be performed on the specified image set through said specification input, and transmits image information and said processing indicator information of said specified image; and an image processing apparatus that is connected to said portable information communication device through a communication line, receives said image information and said processing indicator information of said specified image transmitted from said portable information communication device, and performs image processing on the received image information of said specified image based on the received processing indicator information;

wherein said processing indicator information contains output indicator information with reference to which a processed image obtained by performing the image processing is outputted to an output destination, and said image processing apparatus outputs the processed image of the specified image based on said output indicator information, wherein said processing apparatus outputs the processed image to a medium selected among a plurality of media as indicated by the output indicator information.

15. The image processing system according to claim 14, wherein where a TV station is indicated among the media by the output indicator information, the processed image is displayed through a channel dedicated to a user of the portable communication device.

* * * * *